Feb. 24, 1953
G. HEYS
2,629,644
FISHING TACKLE BOX
Filed April 20, 1949
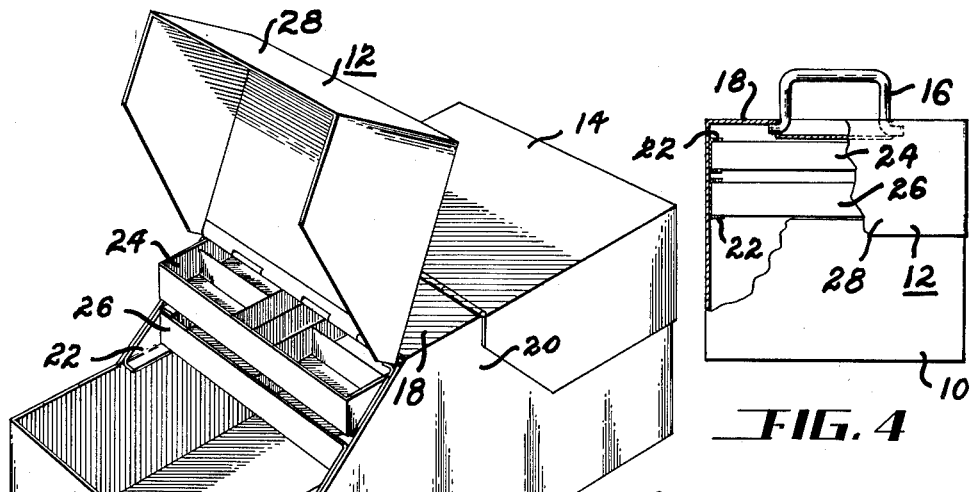
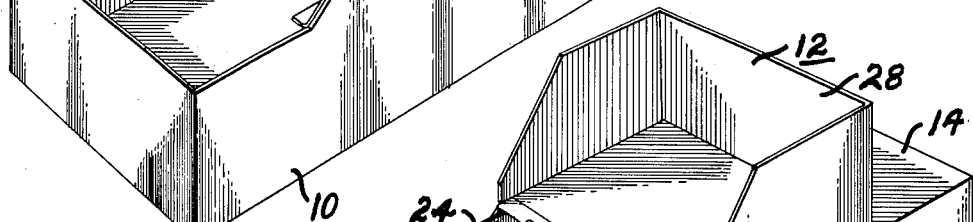
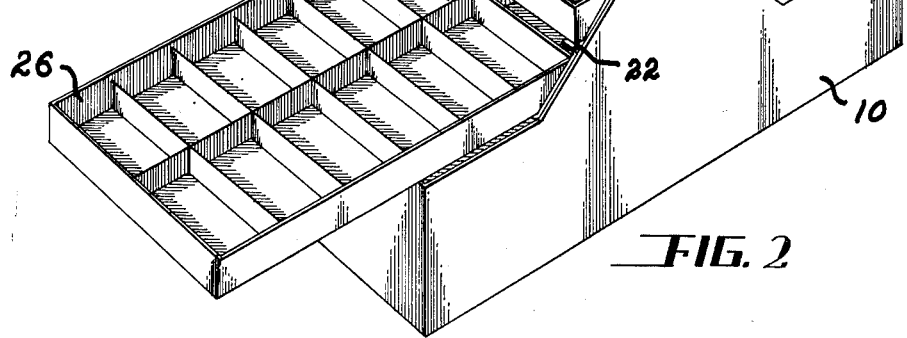
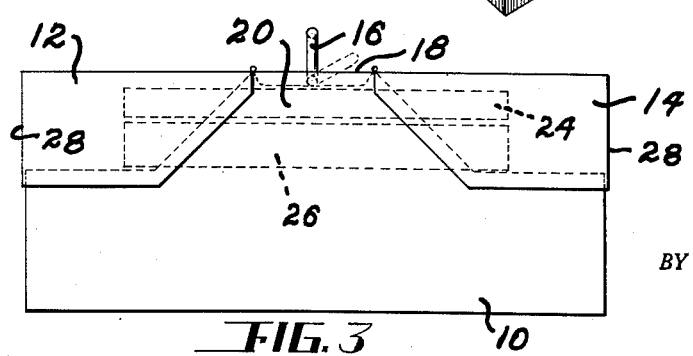
INVENTOR.
GEORGE HEYS,
BY Dybvig & Dybvig,
HIS ATTORNEYS Patented Feb. 24, 1953

2,629,644

UNITED STATES PATENT OFFICE 2,629,644

FISHING TACKLE BOX

George Heys, Dayton, Ohio

Application April 20, 1949, Serial No. 88,660

1 Claim. (Cl. 312—286)

This invention relates to a fishing tackle box or the like having movable trays supported within the box.

A large number of tackle box designs have been devised from time to time and have served their intended purpose with varying degrees of success, but none of them have succeeded in combining simplicity with practicability. Perhaps the most common type of tackle box is that in which trays are provided directly beneath a lid which is hinged at one side of the box and wherein the trays move with the lid off to the side of the box as the lid is moved to the open position. Boxes of this general type require a great deal of room when fully opened and unless one is careful and sets the box on a level surface, the box will tip over due to the unbalanced condition created by the lid and the trays moving toward the one side of the box. Boxes of this type have a further objection in that the handle is secured to the lid and unless the lid is securely latched or unless an expensive and complicated interlock is provided between the handle and the box structure, there is danger of the box coming open and spilling while being carried. To partially overcome some of these defects, other tackle boxes have been devised in which the lid is made in two sections and some of the trays moved to the one side and the other trays moved to the other side, but these boxes require an excessive amount of space and are also fairly easy to upset when being opened.

Since tackle boxes are frequently used in boats where the amount of space available for the box is at a premium and where the box is often placed on a surface which is not level and since it is frequently necessary for a fisherman to hold his rod and reel or other equipment in the one hand while opening the tackle box and removing equipment from the tackle box, it is of utmost importance to provide a box which may easily be opened with one hand in cramped quarters without the danger of upsetting the box. It is the purpose of this invention to provide an improved type of fishing tackle box which incorporates the necessary safety features in a compact and inexpensive box.

Thus, it is an object of this invention to provide a box in which the arrangement of the lid and the trays within the box is such that the box may be opened to expose the contents of the trays and/or the box itself without danger of upsetting the box.

Another object of this invention is to provide an improved lid arrangement which eliminates the need for any special latching means.

Another object of this invention is to provide a fishing tackle box in which the handle is secured directly to a fixed portion of the box rather than to the lid.

Another object of this invention is to provide a fishing tackle box which may be opened from either end.

Still another object of this invention is to provide a box having trays movable lengthwise relative to the box.

Other objects and advantages reside in the construction of parts, the combination thereof and the mode of operation, as will become more apparent from the following description.

In the drawings:

Figure 1 is a perspective view showing the one lid section opened and showing the trays arranged so as to give access to the bottom of the box;

Figure 2 is a somewhat similar perspective view but showing the one tray arranged so as to expose the entire contents thereof;

Figure 3 is a side elevational view of the box; and

Figure 4 is a fragmentary sectional view showing the tray guides.

Referring now to the drawings wherein I have shown a preferred embodiment of my invention, reference numeral 10 designates the main box having lids 12 and 14 which are arranged to open as shown. For purposes of illustration, the box 10 has been shown in the form of a sheet metal box, whereas it is obvious that the box could be made of wood or any other suitable material.

A handle 16 is secured to the top crosspiece 18 which forms a fixed portion of the box 10. The central portion of each side wall of the box 10 is provided with an integral upstanding portion 20 to which the crosspiece 18 is rigidly secured. By securing the handle directly to a fixed portion of the box rather than to the lid, the danger of spilling the contents of the box when picking it up by the handle is completely eliminated.

The upstanding portions 20 are provided with tray guides 22 (see Figure 4) which may be welded or otherwise secured to the portions 20. For purposes of illustration, I have shown a box in which two removable trays 24 and 26 are provided, whereas the number and depth of the trays may be varied and, if desired, any conventional means may be provided for preventing complete removal of the trays. The trays are slidably supported on the tray guides 22 and have been shown as removable from the box for convenience. The end wall 28 of each lid section serves to prevent the trays from sliding out of place when the lids are closed, such as when the box is being carried around. Each of the trays is shorter than the box itself so that by sliding the trays toward the one end as shown in Figure 1 of the drawing, it is possible to have access to the bottom portion of the box without the need for removing the trays.

Since the handle is normally concealed when one or the other of the lid sections is in its fully open position, one would naturally close the lids before picking up the box by the handle. Consequently, the arrangement serves as an extra safety feature which discourages the user from picking up or carrying the box around without closing the box. It will be noted that the box is not provided with any latch or lock for the lid sections as the lid sections are independent of the handle and tend to remain in the closed position when once closed, even though the box is tilted.

It should be noted that the trays slide longitudinally within the box rather than sideways and consequently even though one or more of the trays overhangs a portion of the box, the overhang is at the end of the box rather than at the side and consequently there is little, if any, tendency for the overhanging tray to upset the box.

While the arrangement disclosed herein is particularly suitable for use as a fishing tackle box since it requires little space in a boat but yet includes the necessary trays for storing an assortment of lures and the like and is particularly stable even though placed on a slanting surface, it could also be used for other purposes such as carrying tools and other types of equipment.

The simplicity of the device does not detract from its practicability but adds to the useful life of the box since there is no complicated tray lifting mechanism or the like to give trouble or wear out.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A tackle box or the like comprising a body substantially rectangular in horizontal outline and formed from sheet material, the sides of the body being highest at the center thereof and there connected by a transversely extending member, each of the sides of the body having a pair of diagonally disposed upper edge portions extending downwardly from the highest portion and merging into horizontally disposed edge portions, the height of the horizontally disposed edge portions being substantially lower than the upper edge of the center part of the body and coextensive with the height of the upper edges of the end portions, a pair of cover members each of said cover members including a horizontally disposed top portion, a vertically disposed end portion overlapping the margin of the end of the body when in closed position, and side portions overlapping the sides of the body when in closed position, said body and said cover members when closed being substantially rectangular in vertical outline, a pair of trays, and rails for supporting the trays, the rails for one tray being located above the level of the rails of the other tray, the rails of the lower tray being located above the upper edges of the ends of the body, the trays having a length approximately two-thirds the length of the body so that both trays may be moved into either end to provide an access opening to the bottom of the box when opening the cover member opposite the end towards which the trays have been moved.

GEORGE HEYS.

REFERENCES CITED

The following references are of record in the file of this patent:

UNITED STATES PATENTS

| Number | Name | Date |
|---|---|---|
| 344,212 | Stephens | June 22, 1886 |
| 365,245 | De Graff | June 21, 1887 |
| 788,735 | Stephan | May 2, 1905 |
| 1,497,377 | Lucas | June 10, 1924 |
| 1,599,303 | Swanson | Sept. 7, 1926 |
| 1,880,461 | Moyes | Oct. 4, 1932 |
| 2,038,932 | Haupt | Apr. 28, 1936 |